(12) United States Patent
Bergman

(10) Patent No.: US 7,097,346 B2
(45) Date of Patent: Aug. 29, 2006

(54) METHOD AND SYSTEM IN CONTROL OF COATING COLOR RECIPE

(75) Inventor: John Bergman, Kaarina (FI)

(73) Assignee: Metso Paper, Inc., Helsinki (FI)

( * ) Notice: Subject to any disclaimer, the term of this patent is extended or adjusted under 35 U.S.C. 154(b) by 234 days.

(21) Appl. No.: 10/475,052

(22) PCT Filed: Apr. 18, 2002

(86) PCT No.: PCT/FI02/00324

§ 371 (c)(1),
(2), (4) Date: Mar. 1, 2004

(87) PCT Pub. No.: WO02/086239

PCT Pub. Date: Oct. 31, 2002

(65) Prior Publication Data

US 2004/0144164 A1    Jul. 29, 2004

(30) Foreign Application Priority Data

Apr. 20, 2001   (FI) .................................. 20010818

(51) Int. Cl.
*B01F 15/04*   (2006.01)
*B01F 3/22*    (2006.01)
(52) U.S. Cl. .................... 366/152.3; 366/136
(58) Field of Classification Search ............... 366/136, 366/137, 152.3; 118/712, 602; 427/345
See application file for complete search history.

(56) References Cited

U.S. PATENT DOCUMENTS

| 4,403,866 | A | * | 9/1983 | Falcoff et al. ............... 366/132 |
| 4,974,964 | A | * | 12/1990 | Yoshihara et al. ........ 366/152.1 |
| 5,338,361 | A | | 8/1994 | Anderson et al. |
| 5,360,629 | A | * | 11/1994 | Milbourn et al. .............. 427/8 |
| 5,455,422 | A | | 10/1995 | Anderson et al. |
| 5,817,929 | A | | 10/1998 | Petrila et al. |

FOREIGN PATENT DOCUMENTS

| EP | 0 473 424 A2 | 3/1992 |
| EP | 0 535 321 A1 | 4/1993 |
| WO | WO 02/086239 A1 | 10/2002 |

OTHER PUBLICATIONS

International Preliminary Examination Report issued in PCT/FI02/00324, 7 pgs.
International Search Report issued in PCT/FI02/00324, 3 pgs.

* cited by examiner

*Primary Examiner*—Tony G. Soohoo
(74) *Attorney, Agent, or Firm*—Stiennon & Stiennon

(57) ABSTRACT

The amount of at least one coating mix component and/or the ratios of two or more components are measured by a measuring device arranged in conjunction with the coating mix. The measurement is taken from finished coating mix and/or coating mix to be recycled for use in the manufacture of new coating mix. On the basis of the measurement result the ratios and/or amount of the components fed into the coating mix to be manufactured and/or recycled are controlled.

14 Claims, 5 Drawing Sheets

METHOD AND SYSTEM IN CONTROL OF COATING COLOR RECIPE

CROSS REFERENCES TO RELATED APPLICATIONS

This application is a U.S. National Stage application of International Application No. PCT/FI02/00324, and claims priority on Finnish Application No. FI 20010818, Filed Apr. 20, 2001.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and system in control of a coating Color recipe.

The chemical composition of coating mix in manufacture, that is, for example its pigment, binder and thickener composition and the amount of other additives, are determined on the basis of a coating Color recipe. The coating Color recipe determines the amounts and/or ratios of the various components of the coating mix. According to the Color coating recipe, the coating mix may contain, for example, 50 parts calcium carbonate, 50 parts kaolin, 10 parts latex and 0.1 parts lye, that is, the sum of the ratio of the components may be greater than 100. Control of the coating Color recipe in this connection refers to measures, whose purpose is to produce a new coating mix complying with the coating Color recipe, or to make a partly recycled coating mix as close as possible to the coating mix according to the coating Color recipe.

In the manufacture of coating mix, recycled mix, that is, for example, coating mix collected from the machine cycle, or recovered mix, is used as one component to reduce manufacturing costs. Concentrate, that is, mix recovered by filtering (for example by means of an ultrafilter or nanofilter) from collected waters containing coating, is also often used in coating mix manufacture. In addition, in coating change, that is, in connection with changing the coating Color recipe, the aim is to recover the old coating. Recovery takes place partly by pumping the coating mix from the machine cycle to a recovery tank. Coating mix is also conveyed to the recovery tank partly along with the washing waters. The dry matter content of the fraction obtained through recovery by these two methods may vary considerably, being typically between 0.5–65%. The collection methods and different methods for treating the fractions also cause chemical changes in the properties of the coating. For example, in ultrafiltration, small-molecule components, such as, for example, the dextrines of the starch contained in the coating mix, pass through the filter with the water, whereby the structure of the coating mix changes as the amount of small-molecule components changes.

The properties of the mix in the machine cycle are known to change in connection with the coating process. The changes are caused, among other things, by the migration of binder, water, optical brightener and other components to the base paper. Some of the changes are also due to the evaporation of water when the coating is in contact with air, for example, in the return trough and on the surface of the machine chest. The water balance of the machine cycle may also change due to the effect of external factors, such as, for example, cleaning showers and condensate waters.

Due to the effect among other things, of the changes and uncertainty factors described above, in known solutions the concentrate is typically almost always treated in terms of the calculation as a pigment. However, in addition to pigment, the concentrate also contains many other components, such as latex. If the chemical composition of the concentrate, that is, the amount of components contained in it, or their ratio, were known, then for example in coating mix manufacture, the amount of latex could be reduced, which would result in considerable cost savings.

Furthermore, changes in the properties of coating mix affect the quality of the final coating and the runnability of the coating process. Thus, for example, a decrease in the amount of thickener and latex will increase the viscosity of the coating mix, which will have a significant effect on the runnability of the coating process. Furthermore, it is also known that using concentrate in the manufacture of coating mix will decrease the viscosity of the finished coating mix.

Thus a need has arisen to measure the properties of coating mix in the machine cycle and during coating mix recovery. There has also arisen a need to control the properties of the coating mix to be made on the basis of the properties of the coating mix when ready and when used for coating.

European patent application EP 0 962 769 discloses a method and an apparatus for measuring the properties of a composition or component used in paper or board manufacture. According to the application, a sample taken of the composition is measured for dry matter content, viscosity and pH. A problem with the solution presented in the application is that it does not reveal the chemical composition of the composition. Thus, for example, the real cause of a change in viscosity of the composition cannot be discovered, which means that it is difficult to so remedy the problem effectively and efficiently.

Furthermore, for example, from the patent application WO 99/14579 there is known a method and device for measuring the properties of paper by directing an infrared beam onto the surface of a moving paper web. A beam that has passed through or been reflected from the web is divided into wavelength components by means of a spectrograph and the signals are measured for the various wavelength components, on the basis of which signals the properties of the paper are determined. The application does not, however, disclose the use of the measurement results in the control and/or regulation of coating mix manufacture.

Patent application WO 99/41590 discloses a method and device for measuring the amount of coating on a moving substrate based on reflection measurement. In accordance with the publication, the amount of calcium carbonate is measured by measuring the absorption peak of calcium carbonate in the wavelength range, which is approximately 3.95 micrometers and/or the amount of kaolin is measured by measuring the absorption peak of kaolin in the wavelength range, which is approximately 2.7 micrometers. According to the publication, the measurement results are used for determining the thickness of the coating and not for controlling or regulating coating manufacture.

In addition, Pentti Niemelä and Janne Suhonen have, in their article "An Industrial Raman Spectrometer for Process Measurement Applications", presented a measuring device based on Raman spectroscopy for measuring the chemical properties of matter.

SUMMARY OF THE INVENTION

In the present invention it has been recognized that by measuring the properties of coating mix and/or the recyclable mix used for coating mix manufacture, the coating mix and its manufacture, especially the coating Color recipe, can be controlled and managed efficiently.

The aim of the method and system relating to the present invention is, therefore, to eliminate, or at least substantially reduce the problems due to the above-mentioned prior art, and to provide a method and system in the control of coating mix, by means of which the chemical composition of coating mix can be reliably determined, and which composition data will be used in the manufacture of coating mix.

Another aim of the method and system relating to the present invention is to make possible the manufacture of a new coating mix by utilizing recycled coating mix as efficiently as possible.

A further aim of the present invention is to attempt to predict changes taking place in the coating mix, such as changes in viscosity or water retention.

In a typical method according to the invention, measurement is taken from finished coating mix and/or recycled coating mix used for the manufacture of new coating mix. Finished coating mix in this connection refers to both coating mix discharged from a mixer used for mixing the components in coating mix manufacture, which coating mix is then conveyed to the coating apparatus either directly or via one or more containers, and coating mix already applied to the surface of the material. On the basis of the result of measurement carried out in this way, the ratios and/or amount of the components fed into the coating mix to be manufactured and/or recycled are controlled. In a preferred method according to the invention, the amounts and/or ratios of components obtained as measurement results are compared with the amounts and/or ratios according to the recipe for the coating mix to be made, and control of the ratios and/or amount of the components fed into the coating mix to be made and/or recycled is carried out on the basis of the said comparison. In this connection, the recipe for the coating mix to be made refers to the amount and/or ratio of the coating mix components when the coating mix is made completely of new components.

In a preferred method according to the invention, measurement is carried out on the machine cycle. The measuring device used in the method is then connected either directly to the coating mix transfer line or to a separate sampling line, to which the coating mix is conveyed from the machine cycle. Furthermore, the measurement is most preferably carried out essentially continuously. When measurement is carried out on the machine cycle, no separate sampling and sample transfer, for example, to a laboratory, are required, which makes measurement faster and more reliable. In this case, in addition, an on-line type measuring method can be realized, which method measures the properties of the coating mix continuously or at desired intervals.

In one most preferable method relating to the invention, the amount of binder and/or thickener contained in the coating mix is measured from the coating mix. In this case, changes in the properties of the coating mix can be predicted particularly well, and the amount of binder or thickener can be increased or decreased if necessary. Most preferably, the amount of binder and/or thickener can be measured by comparing their ratio, for example, to the pigment.

In the method according to the invention, for example, NIR-, MIR-, IR- or Raman-spectroscopy can be used as a measuring method, or another method by means of which the chemical properties of a substance can be measured and/or determined.

A typical system according to the present invention comprises at least means for taking measurements from finished coating mix and/or the coating mix to be recycled for making new coating mix, and means for controlling on the basis of the measurement result the ratios and/or amount of the components fed into the coating mix to be made and/or recycled. A preferred system according to the invention also comprises means for comparing the amounts and/or ratios of components obtained as a result of the measurement with the amounts and/or ratios according to the coating mix recipe, and means for controlling the ratios and/or amount of the components fed into the coating mix to be made and/or recycled on the basis of the above comparison.

The system may also be implemented in a preferred manner in such a way that the means for measuring the amount of at least one component or the ratio of one or more components from the coating mix are mounted on the coating mix transfer line. In another preferred system according to the invention, the means for measuring the amount of at least one component or the ratio of one or more components from the coating mix are mounted on the container containing coating mix. When the above-mentioned means are located directly on the coating mix transfer line and/or the container containing coating mix, it is ensured that the object of measurement is a sample representing the true state of the coating mix.

The system according to the present invention may also be realized in a preferred manner in such a way that the means for measuring the amount of at least one component or the ratio of one or more components are connected to the coating mix transfer line and/or the container containing coating mix on one or more sampling lines. By means of the sampling lines, the system can be moved to a location preferable from the point of view of the usability of the system, such as installation or maintenance. Furthermore, by bringing the coating mix to be measured from several points to one place, one measuring device of the system according to the invention can be used for measurement at several measuring points.

Typically, the method according to the invention is implemented by means of a computer software product that can be directly loaded into the main memory of the computer, or by means of a computer software product that is stored on a computer-readable medium, the computer software product containing the program code elements required for implementing the method according to the invention when the said computer software product is run in the computer. A computer software product in this connection refers to independent computer software or part of computer software, which may comprise one or more program code elements. A program code element refers to an element consisting of one or more instructions or commands in computer-readable form. A computer-readable medium in this connection refers to all such media in which data, instructions, commands, series of instructions or commands or the like, which are computer-readable, can be stored permanently or temporarily. Such media are, for example, fixed discs, mass memories, buffer storages, disks and CD-ROMs.

One typical above-mentioned computer software product, which is stored on a computer-readable medium, comprises at least the following program code elements:

a program code element making it possible for the computer to receive measurement data from one or more measuring devices measuring coating mix properties, a program code element enabling the computer to compare the properties of the coating mix based on measurement data with the target properties, and a program code element for enabling the computer to control the feed of the coating mix components in the manufacture of coating mix when the computer software product is run in a computer.

By means of the computer software product, the method according to the invention for controlling the coating mix can be used in a computer or as a part of another device, which comprises the means for running the computer software product in such a way that the method according to the invention can be automated by means of it.

One preferred computer software product according to the invention additionally comprises a program code element for enabling the computer to store—preferably in a database—data on the target properties of one or more coating mixes. The above-mentioned program code element thus makes it possible to use the method for measuring several different coating mix types.

One preferred computer software product according to the invention comprises a program code element for enabling the computer to store in a database at least the measurement data it has received and/or comparison data on the properties of the coating mix obtained on the basis of measurement data compared to the target properties. Thanks to the above-mentioned program code element, a database can be obtained, from which, for example, the behavior of the coating mix as a function of time can easily be monitored.

The greatest advantage of the present invention is that by measuring the amount of thickener and binder contained in the coating to be recycled, the recipe for preparing fresh coating mix can be changed in such a way that the amounts of binder and thickener in the finished coating mix remain constant irrespective of whether concentrate is used in the recipe or not. This results in considerable cost savings, since the amount of the components incurring the greatest costs can be reduced in manufacture by utilizing the components contained in the recyclable coating mix as efficiently as possible.

A further advantage of the present invention is that when the properties of the coating mix to be recycled, such as binder content, etc. are known, it is easy to predict the amount of binder needed in coating mix manufacture for the fresh coating. The final amount of binder can, in a preferred case, be checked by the same method that is used for measuring the properties of recyclable coating.

Furthermore, by means of the method and system according to the present invention, the properties of the coating mix can be kept more stable than before, whereby the runnability of the coating station will improve and there will be fewer interruptions caused by coating.

The invention is described in greater detail in the following, with reference to the appended drawings.

DESCRIPTION OF THE PREFERRED EMBODIMENTS

Figure 1:
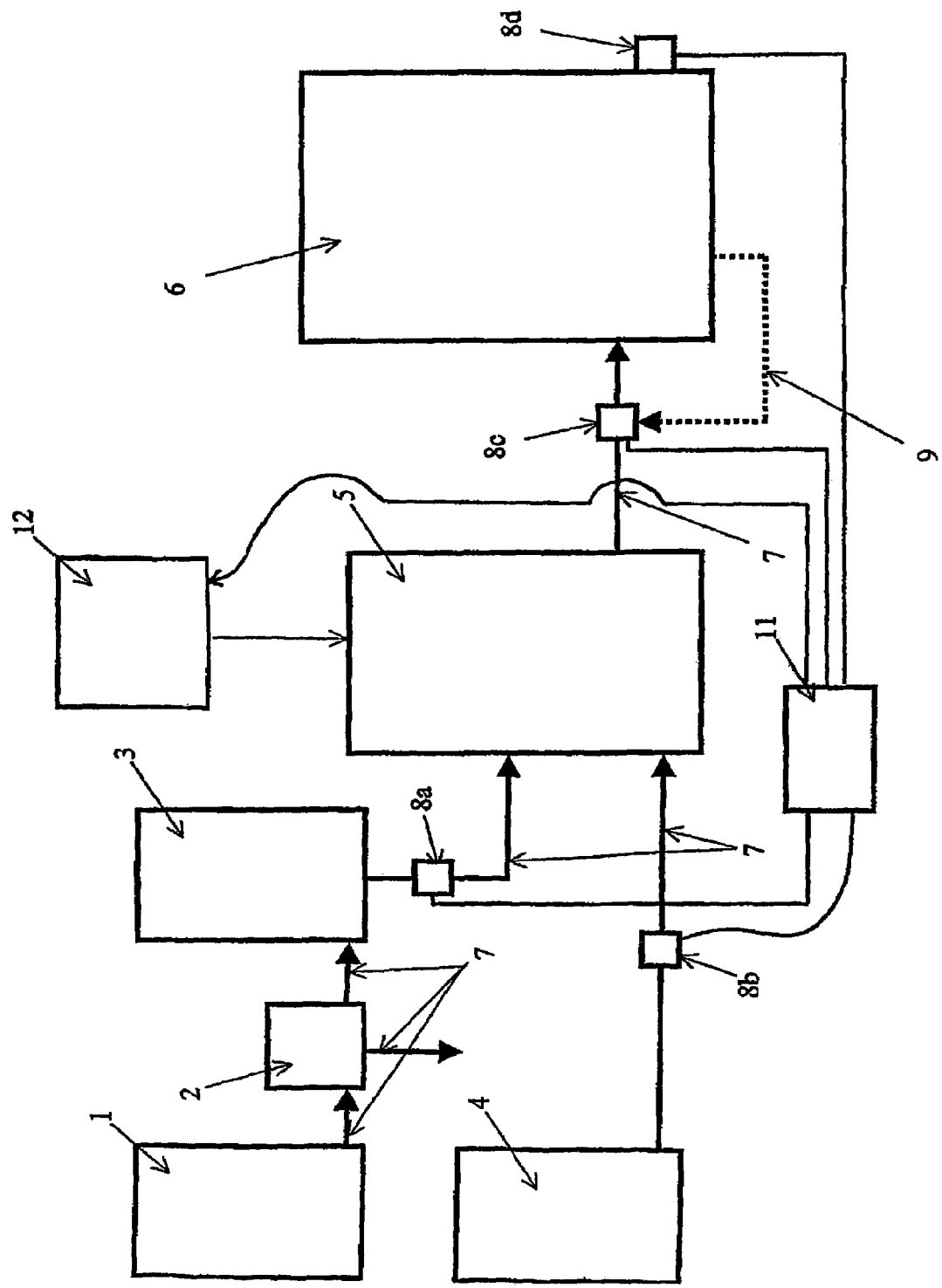
FIG. 1 shows diagrammatically the system relating to the invention as part of the machine cycle.

FIG. 1 shows diagrammatically and by way of an example the system according to the present invention when mounted as part of a machine cycle.

Of the machine cycle, FIG. 1 shows, for example, a recovery tank 1 for washing waters recovered from the coating station. From the washing water recovery tank 1, the washing water containing coating mix is conveyed to an ultrafilter 2, from where the reject, that is, concentrate is conveyed to a concentrate tank 3. The permeate, that is, the water contained in the washing water, can be conveyed to a channel and from there further to a purification plant, or it may be utilized elsewhere in the paper manufacturing process. Further, of the machine cycle is shown a residual mix tank 4 for residual mix, that is, for example, coating mix recovered from the coating machine or mix kitchens, a mixer 5 and a coating station tank 6. The pipes acting as transfer lines are marked with reference numeral 7. The machine cycle also comprises many other devices and parts, such as various pumps and valves, which are not shown in FIG. 1 in order to simplify the Figure. For example, many other components 12 are typically also conveyed to the mixer 5, such components as, for example, carbonate, kaolin, latex, CMC (carboxymethylcellulose), thickener and optical brightener.

Alternative and illustrative locations for the measuring device used in the system are marked with reference numerals 8a–8d. Reference numeral 8a shows a measuring device mounted on the transfer line between the concentrate tank 3 and the mixer 5. Reference numeral 8b refers to a measuring device located between the residual mix tank 4 and the mixer 5. Under reference numeral 8c is shown a measuring device, which is located between the mixer and the coating station tank and thus used for measuring the finished coating mix. The measuring device located in the coating station tank 6 is marked with reference numeral 8d. The measuring device 8d located in the coating station tank can be replaced by conveying coating mix from the coating station tank by a separate sample line 9, for example, to the measuring device 8c, as shown in FIG. 1.

Figure 2:
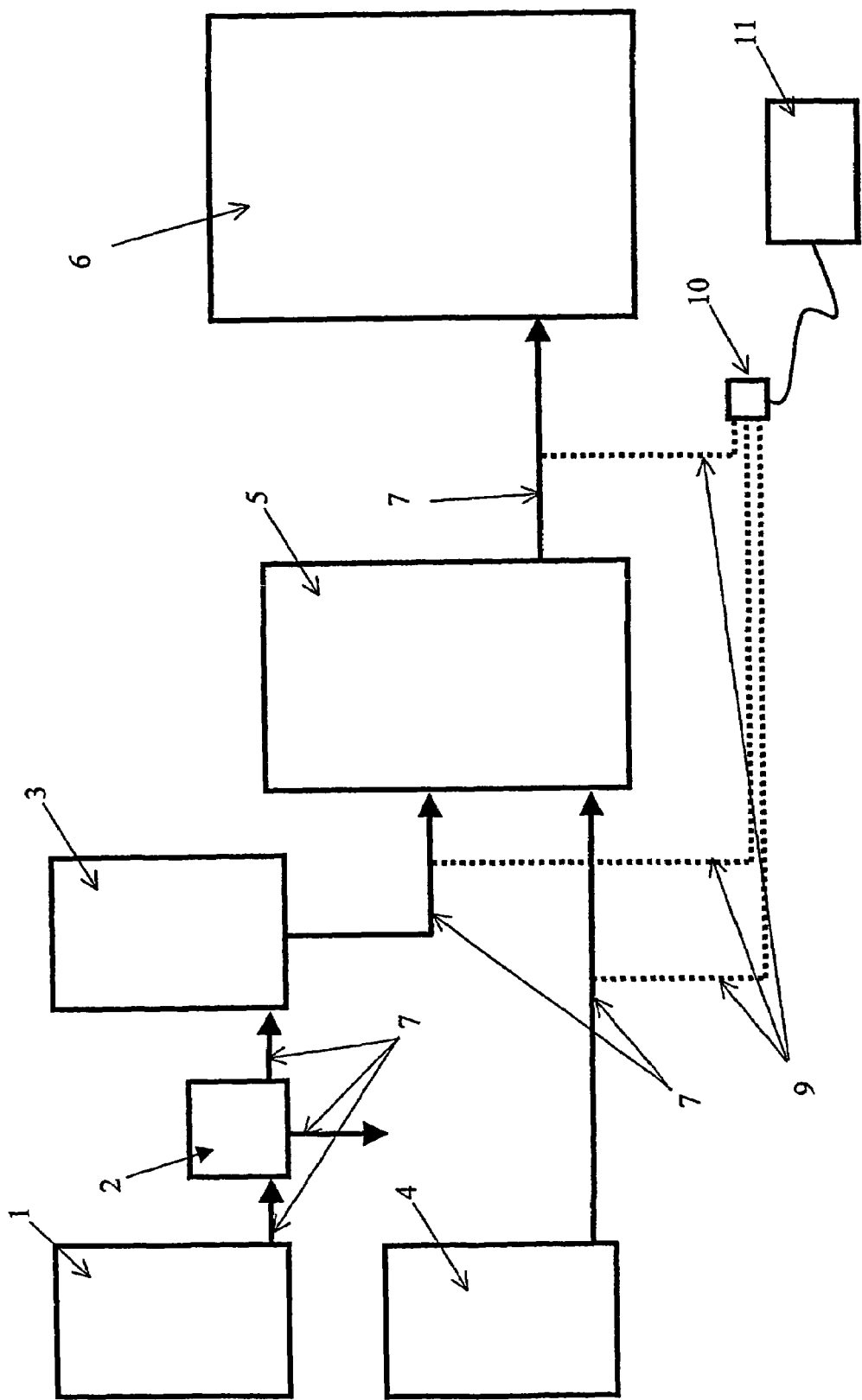
FIG. 2 shows diagrammatically a second example of the location of the measuring device used in the system as part of the machine cycle.

FIG. 2 shows diagrammatically and by way of an example, another alternative solution for locating the measuring device used in the system according to the invention. According to FIG. 2, the measuring device 10 is connected to the transfer lines 7 by means of the sample lines 9, along which a sample of the concentrate, residual mix and finished coating mix is conveyed to be measured. The measuring device 10 is implemented in such a way that it has means for synchronizing sampling, which means that it is possible to take measurements from the desired transfer line at desired intervals. The measured sample can be returned to the transfer fine or it may be conveyed, for example, to the residual mix tank (handling of the measured sample is not shown in the Figure).

In the system according to the invention all the measuring devices shown in FIGS. 1 and 2 are not necessarily needed, but the number and locations of the measuring devices are determined according to the respective needs concerning measurement or use. In addition, the system may be implemented by using measuring devices installed directly on the transfer line or container, or by means of sample lines and any sample containers used.

The type and structure of the measuring devices shown in FIGS. 1 and 2 will depend on the method used for measurement. One measuring device applicable to the system is disclosed in the above-mentioned publication "An Industrial Raman Spectrometer for Process Measurement Applications."

In accordance with what is shown in FIGS. 1 and 2, the measuring devices 8a–8d and 10 are connected in a manner known as such to a control unit 11 controlling the manufacture of the coating mix in order to transmit the measurement data from the measuring devices to the said control unit. The measurement data transferred may be final measurement results on the amounts and/or ratios of components. The calculation of the measurement results can also be implemented in such a way that result calculation and/or analysis is carried out partly or completely in the control unit 11. The control unit compares the measurement result obtained with the base line of the recipe for the coating mix to be made and determines the difference between these. The amount of components in the coating mix to be made or their ratio to each other is determined on the basis of the difference obtained or the ratio calculated from the difference. The system may also comprise other means than the above, such as a computer for calculating or analyzing the results. On the basis of the measurements made by the measuring devices, the control unit 11 controls, for example, the feed of components 12 into the mixer 5 in a manner known as such, taking into account the amounts and/or ratios of components contained in the concentrate and/or residual mix.

The method and system relating to the present invention may also be implemented in such a way that the properties of the finished coating mix are measured from the surface of a material web coated with coating mix, for example, by means of reflection measurement, and this result is used alone or together with other measurements for controlling and/or regulating the manufacture of the coating mix to be made.

Figure 3:
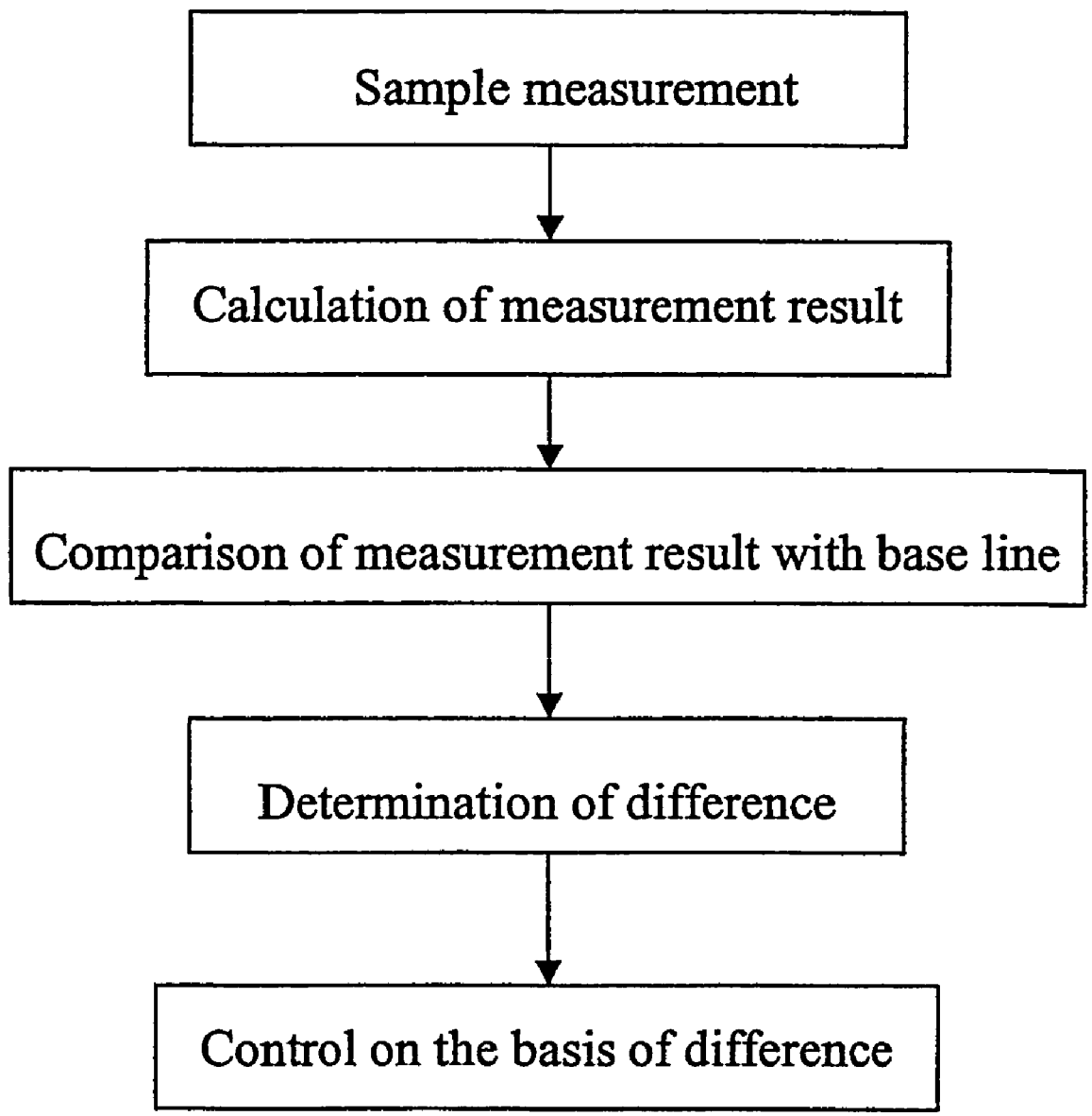
FIG. 3 shows an example of an application of the method according to the invention as a flow chart.

FIG. 3 shows one example of an application of the method according to the invention as a flow chart. The coating mix or concentrate is measured by means of a measuring device mounted in conjunction with the machine cycle, for example, using Raman-spectroscopy. After this, a sample curve of the measurement signal is drawn. The sample curve is compared with the base line according to the coating mix recipe to be measured and the difference between the coating mix to be measured and the recipe is determined. On the basis of the difference obtained, the amount and/or ratios of the components fed into the coating mix to be made or recycled is controlled, for example, by decreasing or increasing the amount of one or more of the coating mix components. If, for example, concentrate with a high latex content is used as one of the raw materials in the manufacture of the new coating mix, the amount of latex fed during manufacture can be reduced compared with the amount according to the coating mix recipe by the amount of latex contained in the concentrate. In this way cost savings are achieved as the consumption of latex decreases. In accordance with the above, measurements based on other than Raman-spectroscopy can also be used in determining the amounts and/or ratios of coating mix components.

Figure 4:
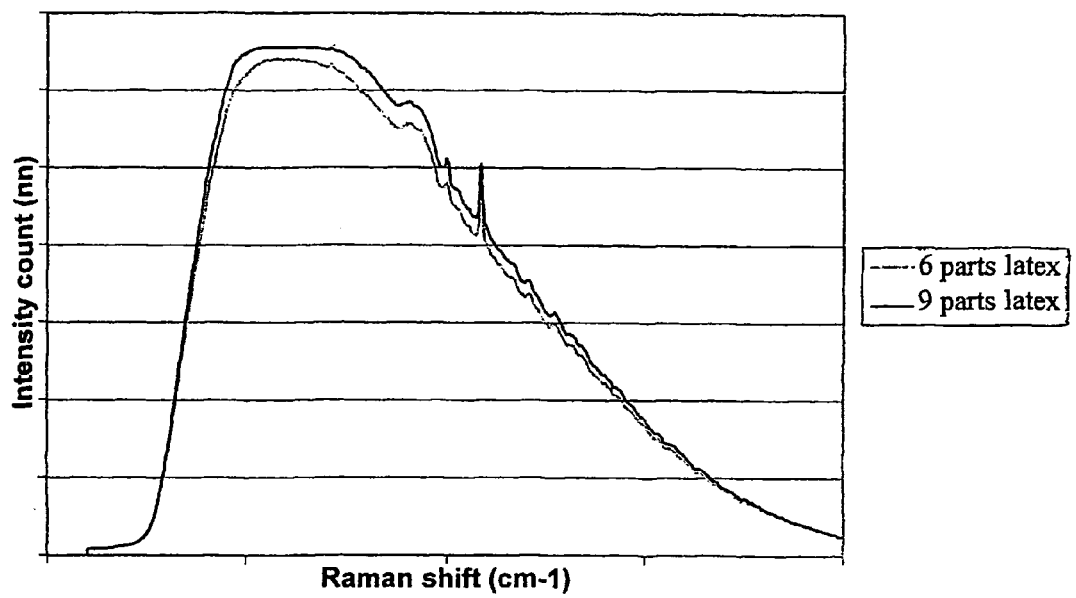
FIG. 4 shows, by way of an example, a measurement result of the method relating to the invention.
Figure 5:
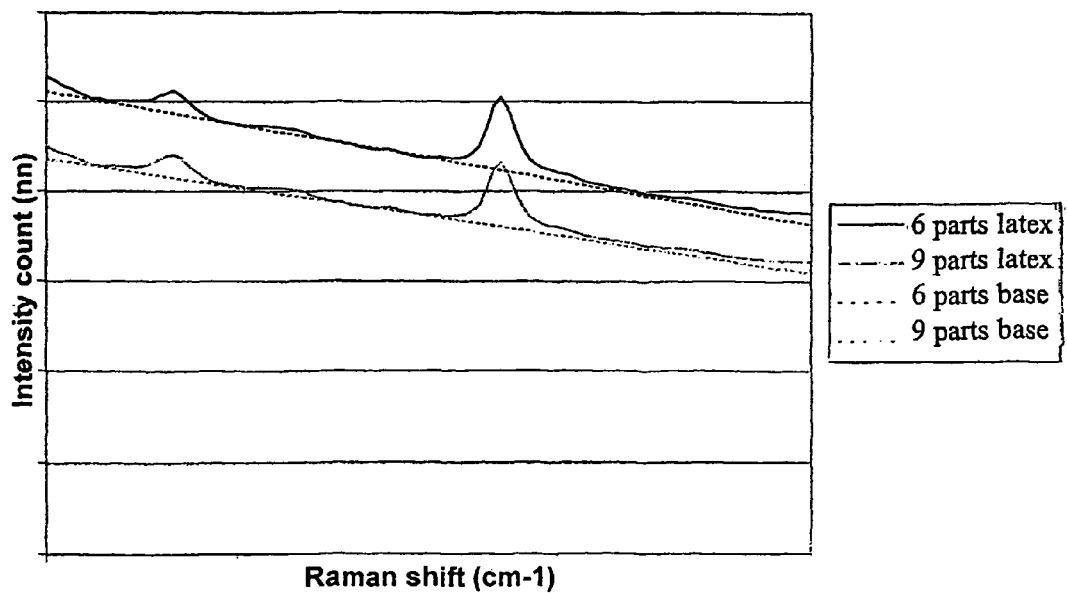
FIG. 5 shows, by way of an example, a measurement result of the method relating to the invention on the base line.
Figure 6:
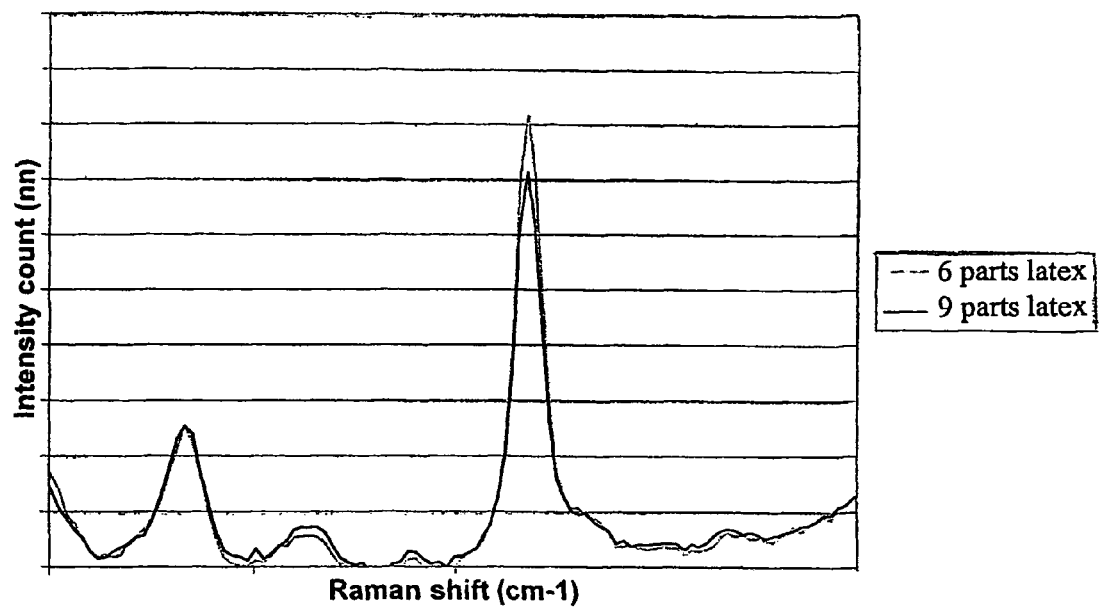
FIG. 6 shows, by way of an example, a measurement result base line corrected of the method relating to the invention.

FIGS. 4 to 6 show by way of an example a measurement result for two coating mixes, the first of which contains six parts latex and the second nine parts latex. A measuring apparatus and method based on Raman-spectroscopy is used in the measurement. The vertical axis in the Figures shows intensity and the horizontal axis shows Raman shift.

FIG. 4 shows the measurement result given by the measuring device, that is, the Raman-spectra for the above-mentioned coating mix samples. In FIG. 5, base line corrections have been made to the spectra of FIG. 4. The base lines are shown by broken lines in FIG. 5. In FIG. 6 the spectra are moved to the base line. The Figures show peaks in different wavelength ranges, which indicate a difference in the amounts and ratios of the components in the samples. By comparing these peaks and/or their ranges with the base line, the ratio of the components and/or the amount of one or more components contained in the sample can be calculated. After this, the result of the calculation may be utilized in accordance with the present invention for controlling and/or regulating coating mix manufacture.

The aim has not been to limit the invention only to the embodiments disclosed in the previous specification, but it may be varied within the scope of the inventive idea presented in the claims.

The invention claimed is:

1. A method in control of composition of a coating color mix comprising the steps of:
   recovering a coating color concentrate from washing water containing coating color mix or recovering coating color residuals from a coating machine or from mix kitchens;
   combining in a mixer a plurality of coating components including at least a thickener and a binder, and the coating color concentrate from the washing water mix, or the coating color residuals, to thus form a finished coating color mix;
   measuring the finished coating color mix to determine at least one property selected from the group consisting of: amount of thickener in the coating color mix, a ratio of the thickener to another component of the coating color mix, amount of binder in the coating color mix, and a ratio of the binder to another component; and
   on the basis of the at least one selected property measured in the finished coating color mix controlling the amount of at least one component added to the mixer in the combining step to form the finished coating color mix.

2. The method of claim 1, wherein the component forming the ratio with the thickener is pigment.

3. The method of claim 1, wherein the component forming the ratio with the binder is pigment.

4. The method of claim 1, wherein the at least one property controlled is controlled to match a recipe for a coating color mix to be made.

5. The method of claim 1, wherein the measurement is carried out between components of a machine cycle, said components including a coating mixer, a concentration tank, a residual mix tank and a coating station tank.

6. The method of claim 1, wherein the steps of measuring the amount of thickener and measuring the amount of binder are carried out essentially continuously.

7. The method of claim 1, wherein the measuring is carried out by NIR-spectroscopy, MIR-spectroscopy, IR-spectroscopy or Raman-spectroscopy.

8. A system for control of a coating color mix, of the type having:
   a means for conveying the coating color mix to at least one measuring point;

a measuring system that comprises means for measuring the amount of at least one component or the ratio of two or more components from the coating color mix;

the improvement comprising:

a means for receiving recycled coating color mix from a coating machine;

a means for taking measurements of the recycled coating color mix used in manufacture of new coating color mix; and a means for controlling on the basis of the measurement result the ratios and/or amount of components fed into the coating color mix to be made and/or recycled.

9. The system of claim 8, wherein the system comprises means for comparing the amount and/or ratios of components obtained as a result of the measurement with the amounts and/or ratios according to a coating color mix recipe, and means for controlling on the basis of the above comparison the ratios and/or amount of the components fed into the coating color mix to be made and/or recycled.

10. The system of claim 8, wherein the means for measuring the amount of at least one component or the ratio of two or more components from the coating color mix are fitted in a coating color mix transfer line.

11. The system of claim 8, wherein the means for measuring the amount of at least one component or the ratio of two or more components from the coating color mix are fitted in a container containing coating color mix.

12. The system of claim 8, wherein the means for measuring the amount of at least one component or the ratio of two or more components from the coating color mix are connected to a coating color mix transfer line and/or a container containing coating color mix on at least one sampling line.

13. A method of controlling and applying a coating color mix containing thickener, binder, and pigment, which is applied to a paper web or board web, comprising the steps of:

forming a coating color mix from recycled coating color and recovered coating color and other components;

measuring the ratio of the thickener to pigment in the coating color mix;

measuring the ratio of the binder to pigment in the coating color mix; and controlling the ratios of thickener to pigment, and binder to pigment, based on the measured ratio of thickener to pigment, and the measured ratio of binder to pigment.

14. A method in control of composition of a coating color mix, the method comprising the steps of:

recovering a coating color concentrate from washing water containing coating color mix or recovering coating color residuals from a coating machine or from mix kitchens;

combining in a mixer a plurality of coating components, including at least a thickener and a binder and either the coating color concentrate from the washing water mix or the coating color residuals, to thus form a finished coating color mix;

measuring the coating color concentrate or recovered coating color residuals to determine at least one property; and on the basis of the at least one determined property, controlling the amount of at least one component added to the mixer in the combining step to form the finished coating color mix.

* * * * *